(12) United States Patent
Katayama

(10) Patent No.: US 7,245,330 B2
(45) Date of Patent: Jul. 17, 2007

(54) ELECTROOPTIC DEVICE, LIQUID CRYSTAL DEVICE, AND PROJECTION DISPLAY DEVICE WITH LINE DEFECTS

(75) Inventor: Shigenori Katayama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 10/314,266

(22) Filed: Dec. 9, 2002

(65) Prior Publication Data

US 2003/0137613 A1 Jul. 24, 2003

(30) Foreign Application Priority Data

Dec. 12, 2001 (JP) ............................. 2001-379181
Oct. 17, 2002 (JP) ............................. 2002-303219

(51) Int. Cl.
*G02F 1/136* (2006.01)
(52) U.S. Cl. .................. 349/43; 257/617; 257/347
(58) Field of Classification Search ............... 349/113; 257/59, 72, 66, 347, 617, 77
See application file for complete search history.

(56) References Cited

U.S. PATENT DOCUMENTS

| | | | | |
|---|---|---|---|---|
| 5,759,878 | A * | 6/1998 | Hayashi et al. | 438/151 |
| 6,316,338 | B1 * | 11/2001 | Jung | 438/487 |
| 6,337,233 | B2 * | 1/2002 | Yang | 438/158 |
| 6,387,779 | B1 * | 5/2002 | Yi et al. | 438/486 |
| 6,479,837 | B1 * | 11/2002 | Ogawa et al. | 257/59 |
| 6,602,765 | B2 * | 8/2003 | Jiroku et al. | 438/487 |
| 6,667,517 | B1 | 12/2003 | Yamazaki | |

FOREIGN PATENT DOCUMENTS

| | | |
|---|---|---|
| EP | 0 991 126 A1 | 4/2000 |
| JP | A 04-001728 | 1/1992 |
| JP | 09-246562 | 9/1997 |
| JP | A 10-189959 | 7/1998 |
| JP | A 11-074538 | 3/1999 |
| JP | A 11-326946 | 11/1999 |
| JP | A 2001-326361 | 11/2001 |
| JP | A 2001-330858 | 11/2001 |
| KR | 2001-0050642 | 6/2001 |
| WO | WO 99/30370 | 6/1999 |

* cited by examiner

*Primary Examiner*—Andrew Schechter
*Assistant Examiner*—Richard Kim
(74) *Attorney, Agent, or Firm*—Oliff & Berridge, PLC

(57) ABSTRACT

To provide an electrooptic device which can reliably suppress a substrate floating effect, such as a parasitic bipolar phenomenon, in an SOI-MIS transistor, and which has superior electrical characteristics. An electrooptic device (liquid crystal light valve) of the present invention uses, as one substrate, a composite substrate including a quartz substrate (main substrate 10A) having a first coefficient of thermal expansion, an insulating layer (insulating underlayer 12) formed on the quartz substrate, and a single-crystal silicon layer (semiconductor layer $1a$) formed on the insulating layer and having a second coefficient of thermal expansion. A TFT 30 that uses the single-crystal silicon layer as a channel region $1a'$ is formed on the insulating layer, and at least one line defect D exists in the single-crystal silicon layer that forms the channel region $1a'$.

11 Claims, 14 Drawing Sheets

FIG. 8
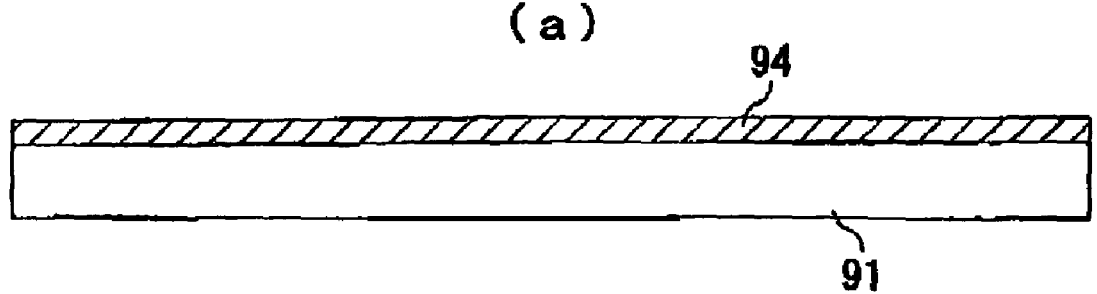
(a)
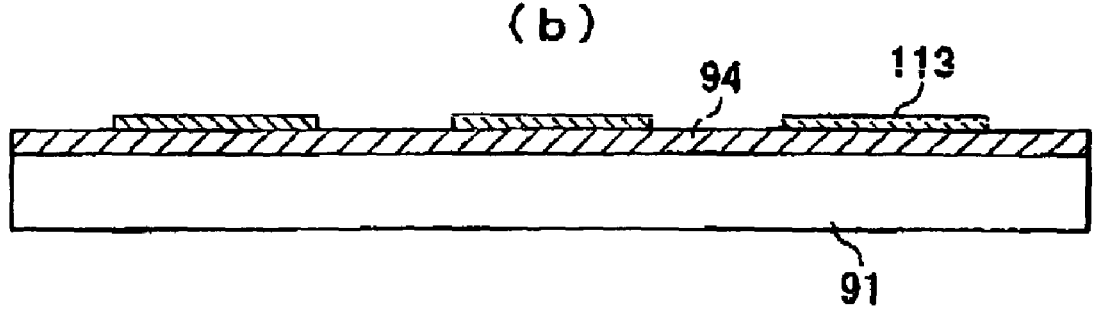
(b)
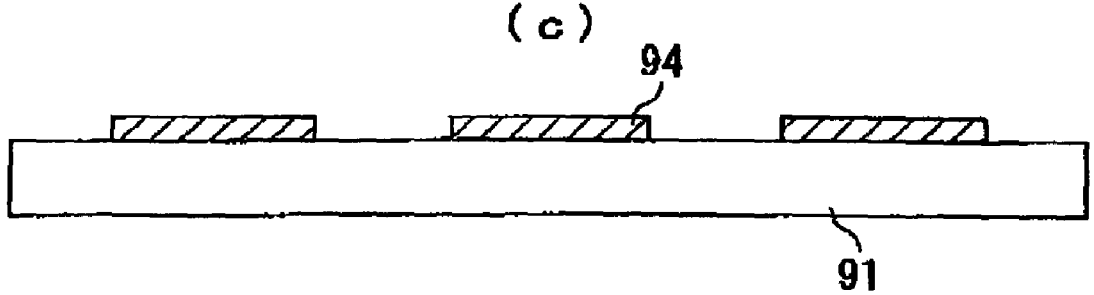
(c)
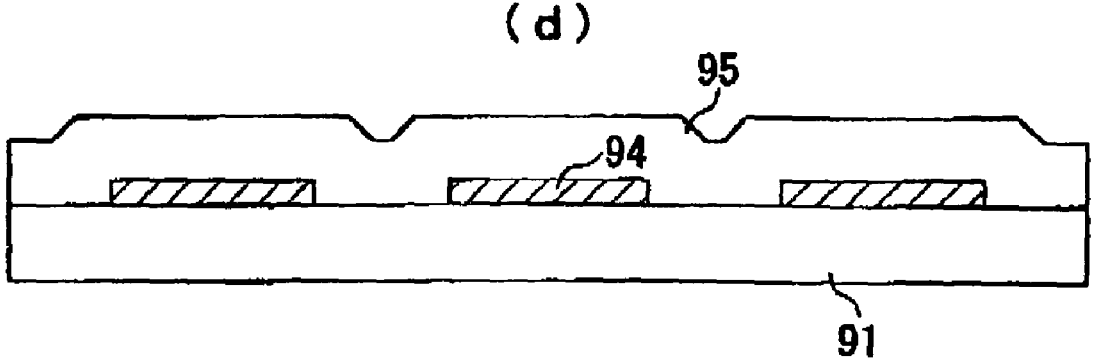
(d)

FIG. 10
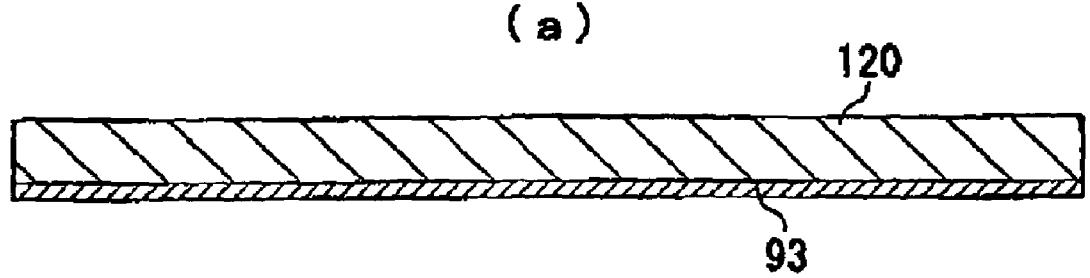
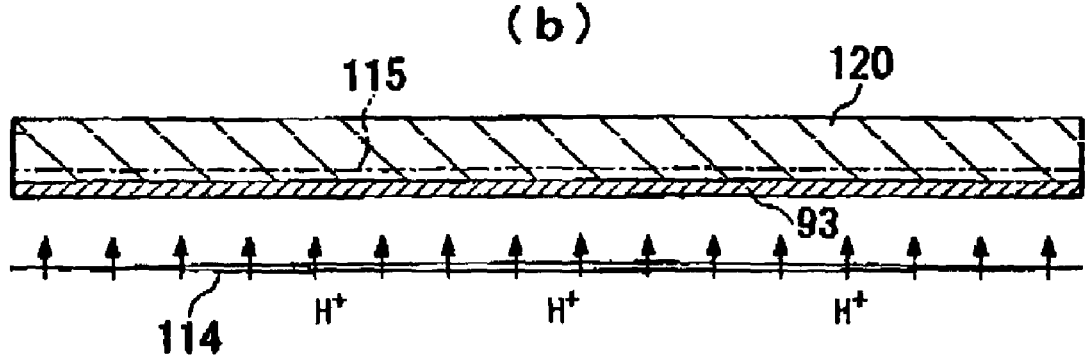
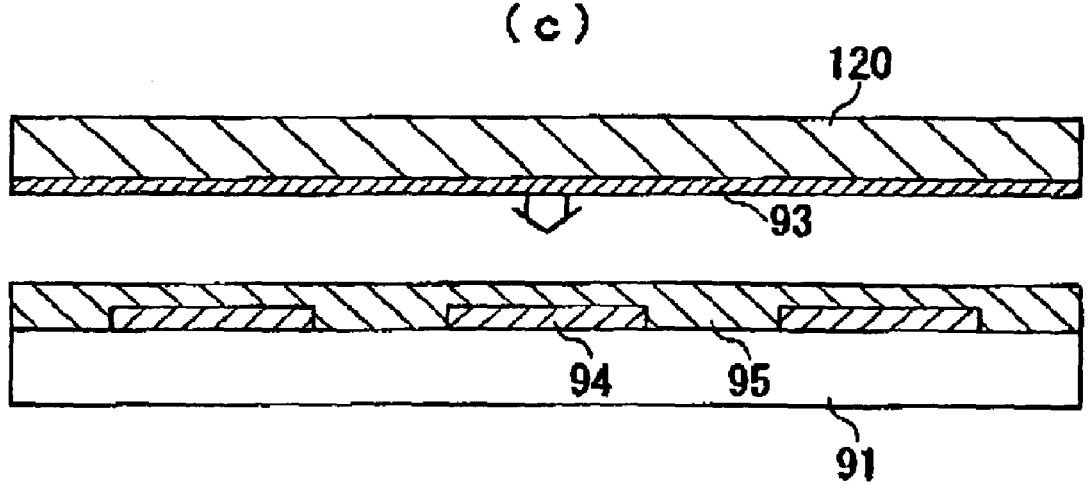

FIG. 11
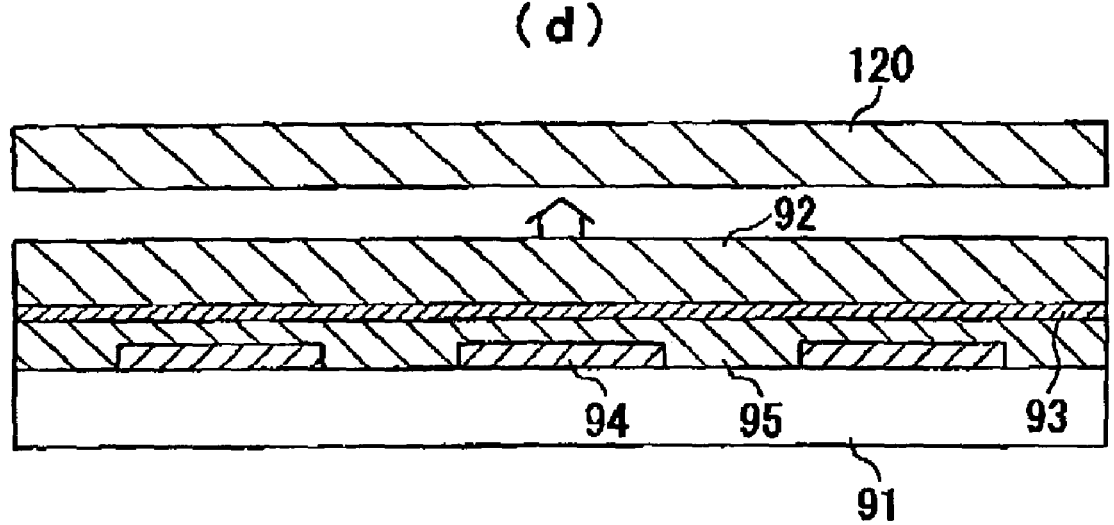
(d)
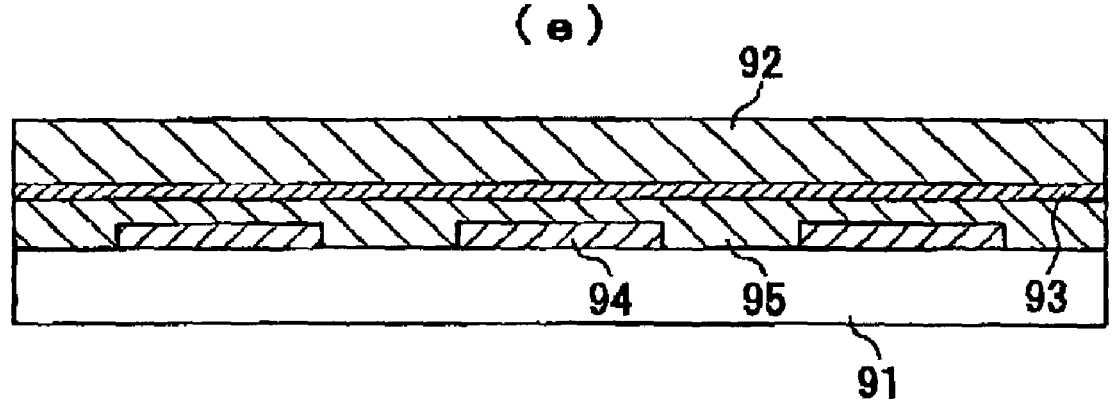
(e)

FIG. 12
(a)
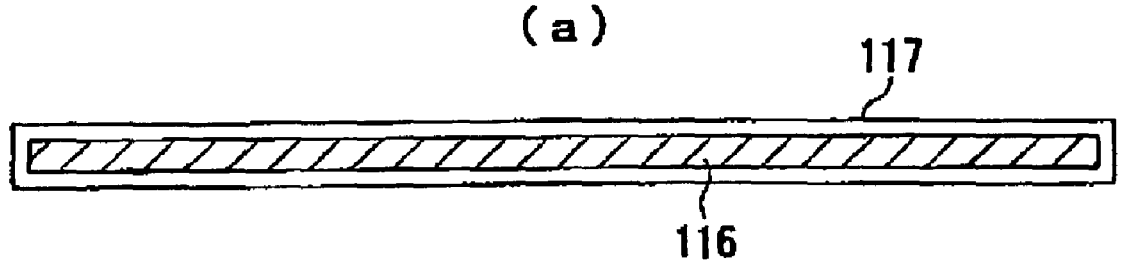
(b)
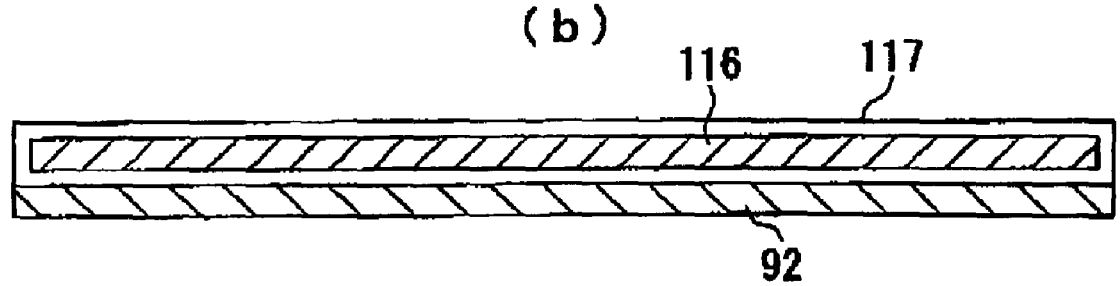
(c)
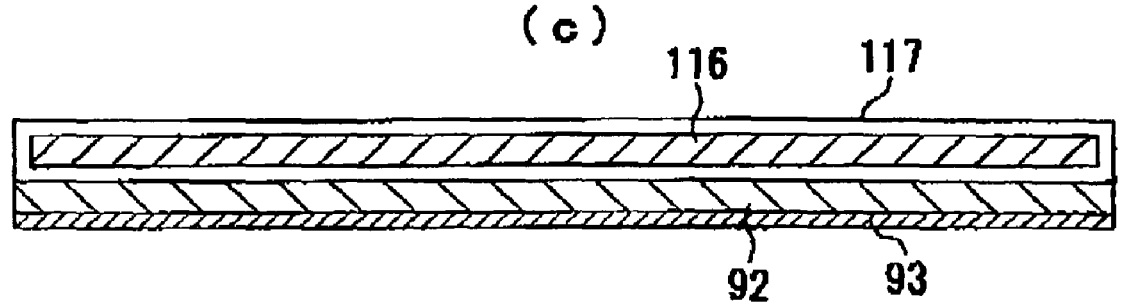

FIG. 13
(d)
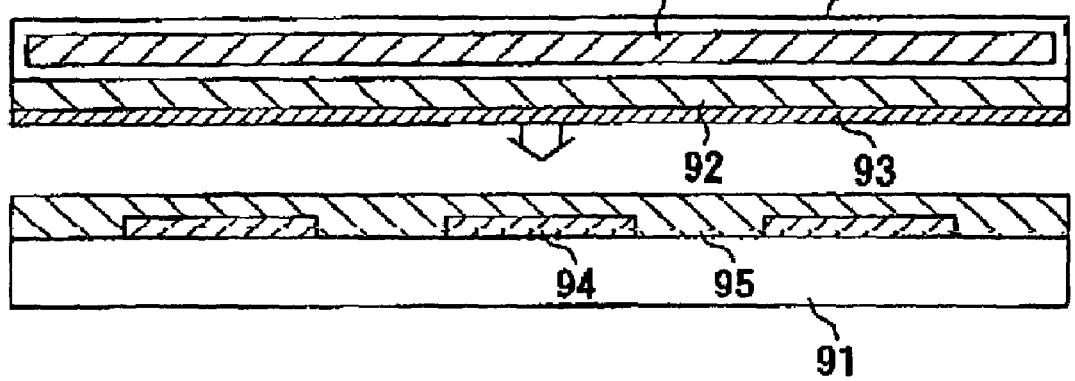
(e)
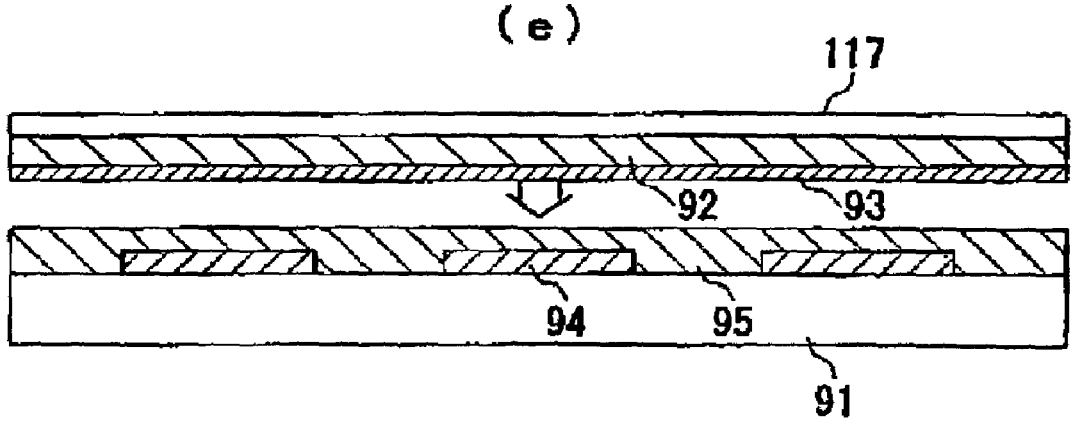
(f)
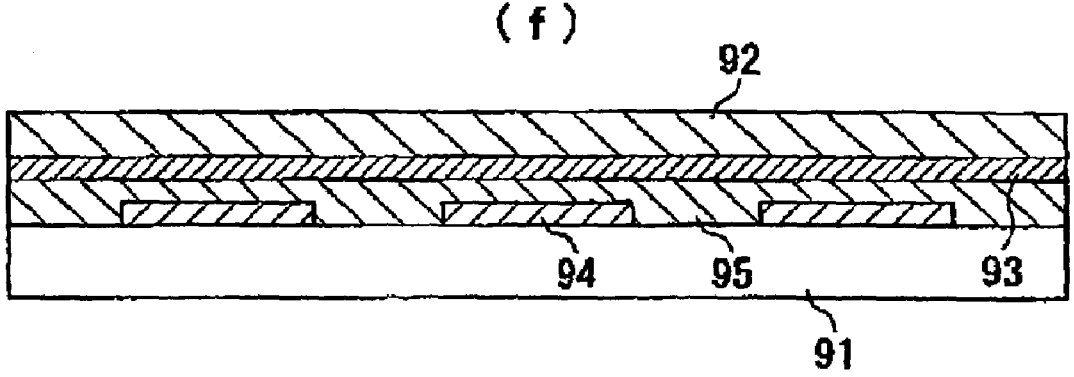

ELECTROOPTIC DEVICE, LIQUID CRYSTAL DEVICE, AND PROJECTION DISPLAY DEVICE WITH LINE DEFECTS

BACKGROUND OF THE INVENTION

1. Field of Invention

The present invention relates to an electrooptic device, a liquid crystal device, and a projection display device. More particularly, the present invention is related to the configuration of an electrooptic device, represented by a liquid crystal device or the like, that can sufficiently suppress a substrate floating effect and that is suitable for use in, for example, a projection display device.

2. Description of Related Art

Currently, SOI (Silicon on Insulator) technology, in which a semiconductor layer made of a single-crystal silicon layer is formed on an insulating layer and a semiconductor device, such as a transistor element, is formed on the semiconductor layer, has the advantages of, for example, providing high-speed devices, low power consumption, and high integration, and is applicable to, for example, electrooptic devices such as liquid crystal devices.

In a general type of bulk semiconductor device, since a channel region of an MIS (Metal-Insulator-Silicon) transistor can be maintained at a predetermined potential by an underlying substrate, the electrical characteristics, such as breakdown voltage, of the device will not be deteriorated by a parasitic bipolar phenomenon that is caused by a change in potential in the channel region, or the like. In contrast, in an SOI-MIS transistor, since the lower side of a channel region is completely isolated by an insulating underlayer, the channel region cannot be fixed at a predetermined potential, unlike in the above transistor, and is in an electrically floating state.

In this case, excess carriers are produced by impact ionization due to the impact of carriers accelerated by an electric field in the vicinity of a drain region on the crystal lattice, and are accumulated on the lower side of the channel region. When the channel potential is increased by such accumulation of excess carriers on the lower side of the channel region, a source-channel-drain NPN structure (in the case of an N channel type) works as an apparent bipolar element, and therefore, the electrical characteristics are deteriorated. For example, the source/drain breakdown voltage of the device is lowered by an abnormal current. A series of phenomena caused by the electrically floating state of the channel region are called substrate floating effects.

Accordingly, a technique has been adopted heretofore which suppresses substrate floating effects by forming a body contact region electrically connected to a channel region through a predetermined route and by extracting excess carriers accumulated in the channel region through the body contact region.

However, when a body contact region is formed in each of the MIS transistors used in an pixel region of an electrooptic device represented by a liquid crystal device or the like, the area occupied by the MIS transistors is increased, and this makes it difficult to increase the pixel density. In particular, in a transmissive liquid crystal device, the aperture ratio decreases. Also, in a peripheral driving circuit outside the pixel region, the body contact region makes high integration difficult, the peripheral portion (frame portion) of the device is enlarged, and consequently, size reduction is impossible.

In electrooptic devices used in electronic devices, such as a projection display device, when high-intensity light from a light source enters channel regions and LDD (Lightly Doped Drain) regions of pixel transistors, carriers are produced by optical excitation, charges leak from pixel storage capacitors, and this causes display unevenness such as flicker.

SUMMARY OF THE INVENTION

The present invention has been made to overcome the above problems, and an object of the present invention is to provide an electrooptic device, such as a liquid crystal device, with an SOI-MIS transistor, which can reliably suppress a substrate floating effect, such as a parasitic bipolar phenomenon, and which has superior electrical characteristics.

In order to achieve the above object, an electrooptic device of the present invention has a composite substrate including a support substrate having a first coefficient of thermal expansion, an insulating layer formed on the support substrate, and a single-crystal semiconductor layer formed on the insulating layer and having a second coefficient of thermal expansion different from the first coefficient of thermal expansion. A thin-film transistor using the single-crystal semiconductor layer as a channel region is formed on the insulating layer, and at least one line defect exists in the single-crystal semiconductor layer that forms the channel region.

The present inventor has noted that, in an electrooptic device having a composite substrate including a single-crystal semiconductor layer having a second coefficient of thermal expansion bonded to a support substrate having a first coefficient of thermal expansion with an insulating layer therebetween, that is, a so-called SOI substrate, distortion occurs and multiple line defects (also referred to "dislocation") are produced in the single-crystal semiconductor layer when the support substrate and the single-crystal semiconductor layer having different coefficients of thermal expansion are bonded together. It is generally known that a line defect affects the electrical characteristics because it increases the leak current from a p-n junction of the transistor and shortens the minority carrier lifetime. However, it has been found that this kind of line defect works as a recombination center of excess carriers produced in a channel region by impact ionization in an SOI-MIS transistor, and that the line defect can trap and destroy the excess carriers, and has achieved the features of the present invention.

That is, in the electrooptic device of the present invention, a thin-film transistor (hereinafter abbreviated as a "TFT") having a single-crystal semiconductor layer as a channel region is formed on an insulating layer, and at least one line defect exists in the single-crystal semiconductor layer that forms the channel region of the TFT. Therefore, the line defect acts as a recombination center of excess carriers to prevent the accumulation of the excess carriers, and a substrate floating effect can be suppressed without forming a body contact region. As a result, it is possible to achieve an electrooptic device having superior electrical characteristics while maintaining a high aperture ratio. Furthermore, in a TFT having an LDD structure, even when carriers are produced by optical excitation when light enters an LDD region that cannot be shielded by a gate electrode, the passage of leak current can be prevented by the recombination center formed of the line defect.

For example, a glass substrate or a quartz substrate may be used as specific examples of the support substrate. A single-crystal silicon layer may be used as a specific example of the single-crystal semiconductor layer.

In general, since the coefficient of line expansion of glass is approximately $3\times10^{-6}$ to $10\times10^{-6}$/K, the coefficient of line expansion of quartz is approximately $5.5\times10^{-7}$/K, and the coefficient of line expansion of silicon is approximately $2.6\times10^{-6}$/K, when a glass substrate or a quartz silicon substrate, and a single-crystal silicon layer are bonded to constitute a composite substrate, a lattice-shaped line defect can be produced along a (111) plane of single-crystal silicon. In particular, in a combination SOQ (Silicon on Quartz) substrate of a quartz substrate and a single-crystal silicon layer, there is a great difference in coefficient of line expansion between the layers, multiple lattice-like line defects are produced, and this is suitable to the present invention.

Preferably, the electrooptic device of the present invention includes a display section formed by a plurality of pixels and a peripheral driving-circuit section for driving the display section, and the TFT is used both in the display section and the peripheral driving-circuit section.

As described above, since the TFT of the present invention eliminates the necessity of forming a body contact region, a display section having a high aperture ratio can be achieved, and the area occupied by the peripheral driving-circuit section can be reduced. This allows a narrower frame and a smaller device.

Another electrooptic device of the present invention has a composite substrate including a support substrate having a first coefficient of thermal expansion, an insulating layer formed on the support substrate, and a single-crystal semiconductor layer formed on the insulating layer and having a second coefficient of thermal expansion different from the first coefficient of thermal expansion. A thin-film transistor using the single-crystal semiconductor layer as a channel region is formed on the insulating layer, and at least one crystal defect exists in the single-crystal semiconductor layer that forms the channel region.

While the line defect that is easily produced in the SOI substrate has been described as an example above, not only the "line defect", but also other crystal defects similarly function as a recombination center of excess carriers to trap and destroy the excess carriers. The crystal defects are "point defects", for example, an intrinsic point defect, such as a vacancy or a self interstitial atom, and an extrinsic point defect, such as a substitutional impurity atom, an interstitial impurity atom, or a dangling bond, "plane defects" such as a stacking fault and a grain boundary, and "volume defects" such as a deposit and a void. Accordingly, by producing such a crystal defect into the single-crystal semiconductor layer that forms the channel region of the TFT, the accumulation of excess carriers is prevented, and a substrate floating effect can be suppressed without forming a body contact region.

In a liquid crystal device of the present invention, the composite substrate in the above-described electrooptic device of the present invention serves as a first substrate, and a liquid crystal layer is sandwiched between the first substrate and a second substrate. The first substrate includes pixel electrodes arranged in a matrix so as to apply a voltage to the liquid crystal layer, TFTs electrically connected to the pixel electrodes and each having a channel region formed of the single-crystal semiconductor layer, shielding films disposed offset from the TFTs toward the liquid crystal layer, and data lines disposed offset from the TFTs toward the liquid crystal layer so as to intersect the shielding films, electrically connected to the TFTs, and having a light shielding ability.

In the liquid crystal device of the present invention, since the composite substrate in the electrooptic device of the present invention serves as the first substrate, a substrate floating effect can be suppressed, and a liquid crystal device having superior electrical characteristics can be achieved while maintaining a high aperture ratio. Furthermore, since the data lines have a light shielding ability and intersect the shielding films on the side offset from the TFTs toward the liquid crystal layer, the channel regions that constitute the TFTs are doubly shielded by the data lines and the shielding films.

Therefore, in the liquid crystal device of the present invention, the channel regions of the TFTs can be doubly shielded from incident light (for example, projection light in an application to a projector) by placing the side, where the data lines and the shielding films are formed, on the incident side of the incident light. In this case, for example, even when data lines (for example, having a transmittance of approximately 0.1%) that slightly transmit light because of the thickness and shielding films (for example, having a transmittance of approximately 0.1%) that similarly and slightly transmit light because of the thickness are used, since shielding is doubly performed by both of them, a considerably high light shielding ability (for example, a transmittance of approximately 0.00001% to 0.000001%) can be obtained by the data lines and the shielding films.

Moreover, since the data lines have a light shielding ability in the liquid crystal device of the present invention, it is difficult not only for light perpendicular to the substrate plane, but also for oblique light inclined toward the direction along the data lines to enter the channel regions of the TFTs. Furthermore, in the liquid crystal device of the present invention, it is difficult for oblique light inclined toward the direction along main line portions of the shielding films (that is, the direction orthogonal to the data lines) to enter the channel regions of the TFTs because of the existence of the shielding films. High-intensity incident light from a high-intensity light source mainly contains light perpendicular to the substrate plane. Since such oblique light is, for example, relatively low-intensity light that entails internal reflection and multiple reflection inside the liquid crystal device, such a high shielding performance that shields light perpendicular to the substrate plane is not necessary to shield light at angle to the substrate plane. Accordingly, light that obliquely enters the substrate plane is considerably effectively shielded by the data lines and the shielding films (even a single layer). As a result, in a case in which a high-intensity light source is used, it is possible to effectively prevent the transistor characteristics from being deteriorated by an optical leak current caused by the incidence of incident light on the channel regions of the TFTs.

In the liquid crystal device of the present invention, the shielding layer and the data lines also make it possible to prevent the contrast ratio from being decreased by light leakage in the image display region.

Therefore, the aperture region of each pixel can be defined by the shielding layer and the data lines, and for example, a general shielding film formed on the counter substrate, such as a shielding film called a black stripe (BS) or a shielding film called a black matrix (BM), may be omitted. In addition, since the light shielding layer and the data lines in the liquid crystal device of the present invention are placed relatively closer to the TFTs than the above-described general shielding film formed on the counter substrate, the shielding region is not unnecessarily enlarged, and the aperture region of each pixel is not unnecessarily reduced.

In this way, the liquid crystal device of the present invention allows a liquid crystal device which reduces the deterioration of the characteristics of the TFTs due to light leakage by a high light resistance while limiting the increase in thickness of the shielding films, which can display a high-contrast and high-quality image, and which provides a high endurance while limiting the decrease of the aperture ratio.

In the liquid crystal display device, it is preferable that the shielding films have a light absorbing layer and a shielding layer, and that the light absorbing layer be formed to face the TFTs.

In this feature, since the shielding films have the light absorbing layer and the shielding layer and the light absorbing layer is stacked on the side facing the TFTs, light that travels from the second substrate, passes by the TFTs, and reaches the shielding layers (that is, return light, for example, light reflected by the back of the liquid crystal device, or light that is emitted from another liquid crystal device and passes through a combination optical system in a multipanel projector having a plurality of liquid crystal devices as light valves) can be absorbed by the light absorbing layer. Therefore, incident light incident from the outer side of the shielding films (the opposite side of the side facing the TFTs) can be blocked, and internal reflection light produced inside the shielding films (the side facing the TFTs) can be reduced. As a result, light that reaches the channel regions of the TFTs can be reduced further.

In the liquid crystal device, preferably, a relay conductive film for electrically connecting the pixel electrodes and the TFTs is formed on the sides of the shielding films facing the TFTs with a dielectric layer therebetween, and the shielding films and the relay conductive films function as capacitor electrodes so as to construct a storage capacitor.

In such a liquid crystal device, since the shielding films not only have a shielding function, but also function as capacitor electrodes of the storage capacitor, the increase of the total thickness of the shielding films is reduced. Moreover, it is possible to effectively prevent the multilayer structure on the substrate and production processes from being more complicate than in a case in which the shielding films and the storage capacitor are separately provided.

A projection display device of the present invention can include a light source, an optical modulation device that can be formed of the liquid crystal device of the present invention for modulating light from the light source, and a projection device that projects light modulated by the optical modulation device.

Since the projection display device of the present invention includes the optical modulation device formed of the liquid crystal device of the present invention, even when a high-intensity light source is used, the deterioration of the electrical characteristics due to an optical leak current is suppressed, and a high-quality projection display device can be achieved.

BRIEF DESCRIPTION OF THE DRAWINGS

The invention will be described with reference to the accompanying drawings wherein like numerals reference like elements, and wherein:

FIGS. 8(*a*) to 8(*d*) are views showing processes for producing a first example of an SOQ substrate used in the liquid crystal light valve;

FIGS. 10(*a*) to 10(*c*) are views showing processes for producing a second example of an SOQ substrate used in the liquid crystal light valve;

FIGS. 11(*d*) and 11(*e*) are views showing subsequent production processes;

FIGS. 12(*a*) to 12(*c*) are views showing processes for producing a third example of an SOQ substrate used in the liquid crystal light valve;

FIGS. 13(*d*) to 13(*f*) are views showing subsequent production processes.

DETAILED DESCRIPTION OF PREFERRED EMBODIMENTS

An embodiment of the present invention will be described below with reference to FIGS. 1 to 8. In this embodiment, a liquid crystal light valve (liquid crystal device) used as an optical modulation device in a projection display device will be given as an example of an electrooptic device of the present invention. The liquid crystal light valve of this embodiment is an active-matrix liquid crystal panel, and uses an SOQ substrate on a device substrate side.

Figure 1:
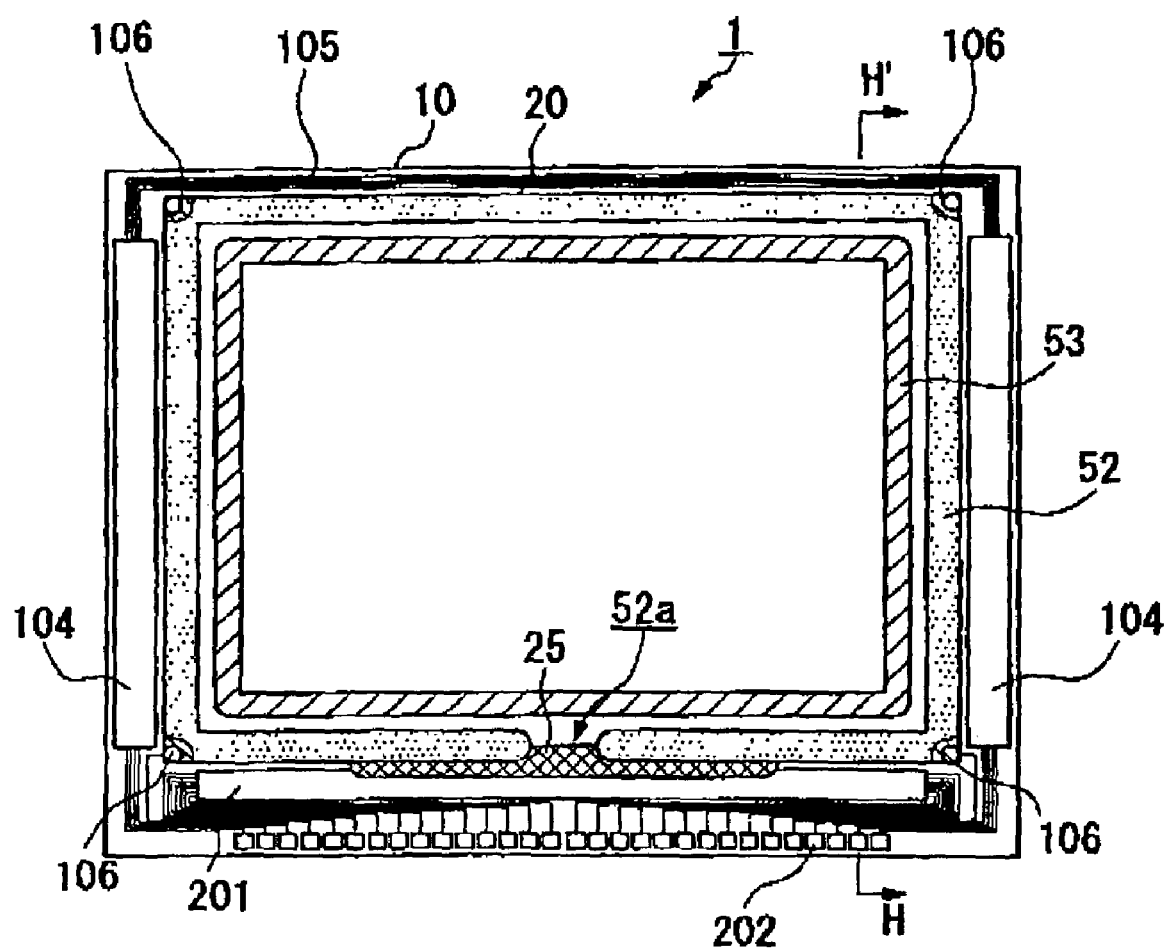
FIG. 1 is a plan view schematically showing the configuration of a liquid crystal light valve serving as an electrooptic device according to an embodiment of the present invention.
Figure 2:
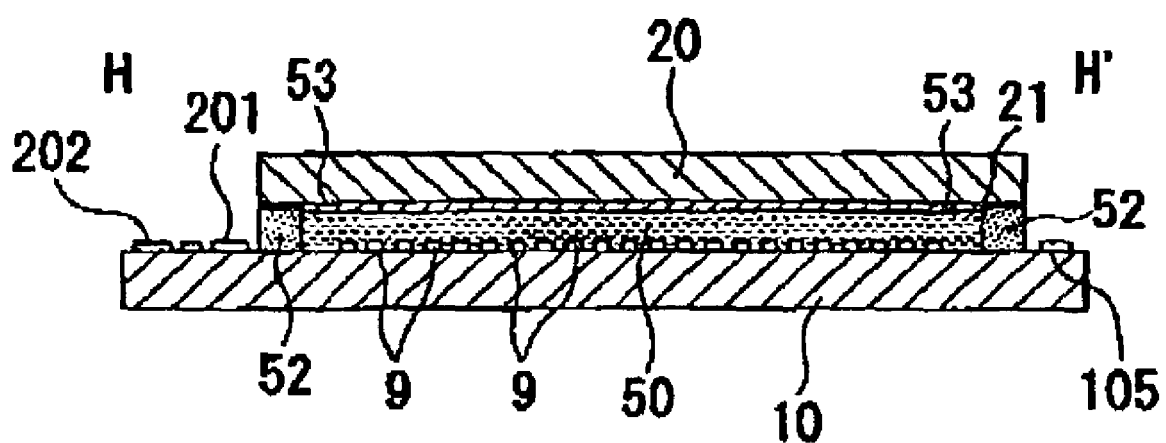
FIG. 2 is a cross-sectional view, taken along line H–H' in FIG. 1, showing the cross-sectional structure of the liquid crystal light valve.
Figure 3:
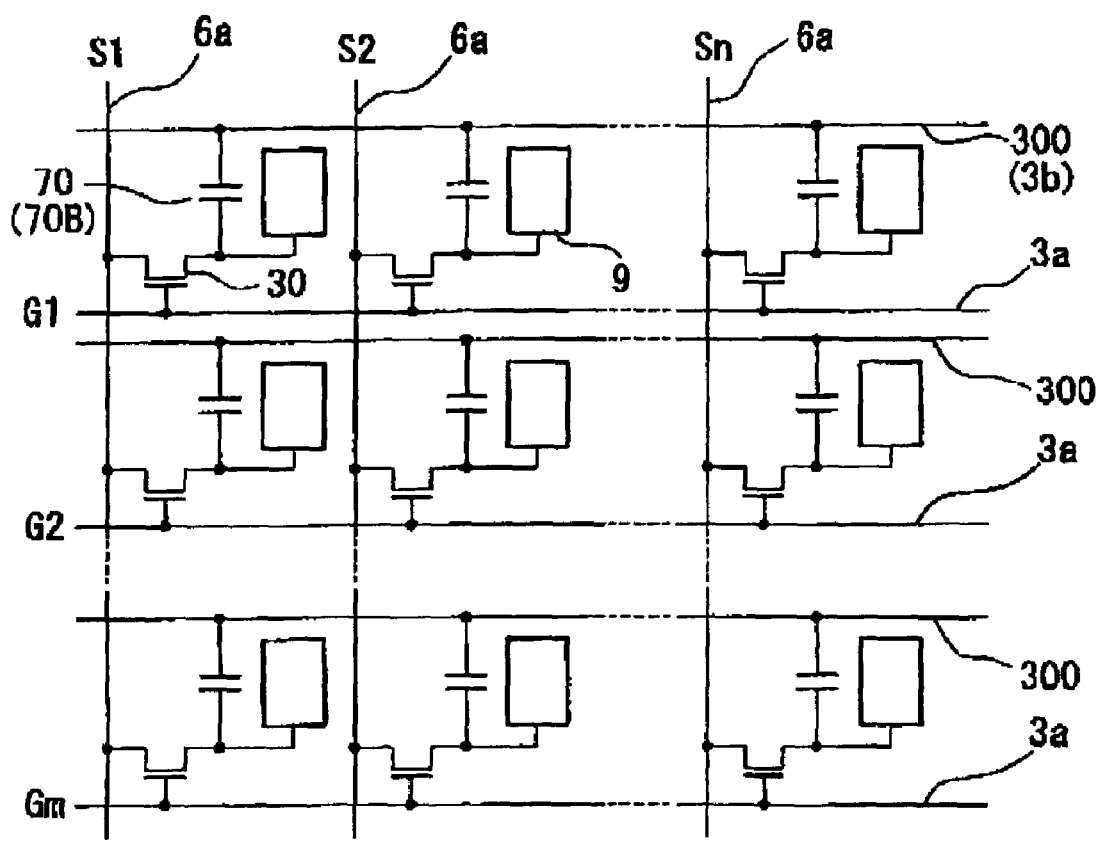
FIG. 3 is an equivalent circuit diagram of a plurality of pixels formed in a matrix so as to constitute the liquid crystal light valve.
Figure 4:
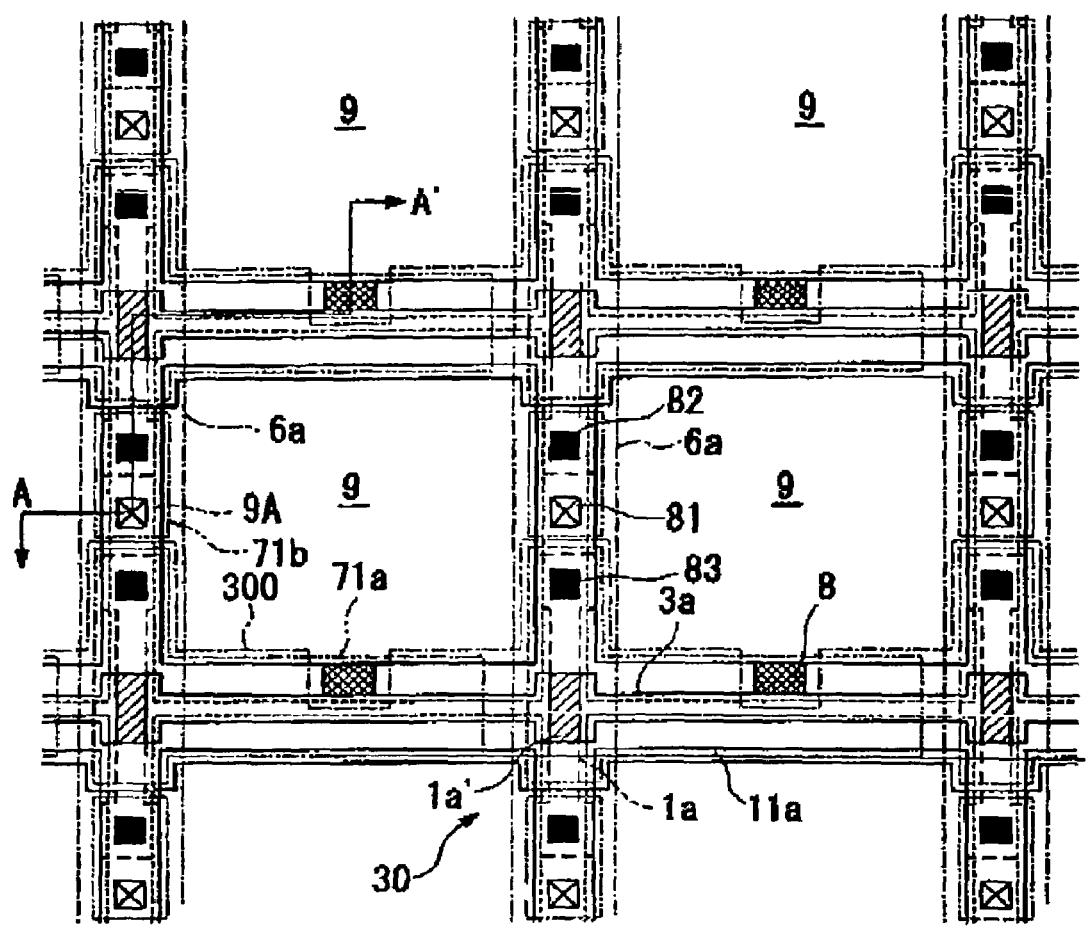
FIG. 4 is a plan view showing the plurality of pixels.
Figure 5:
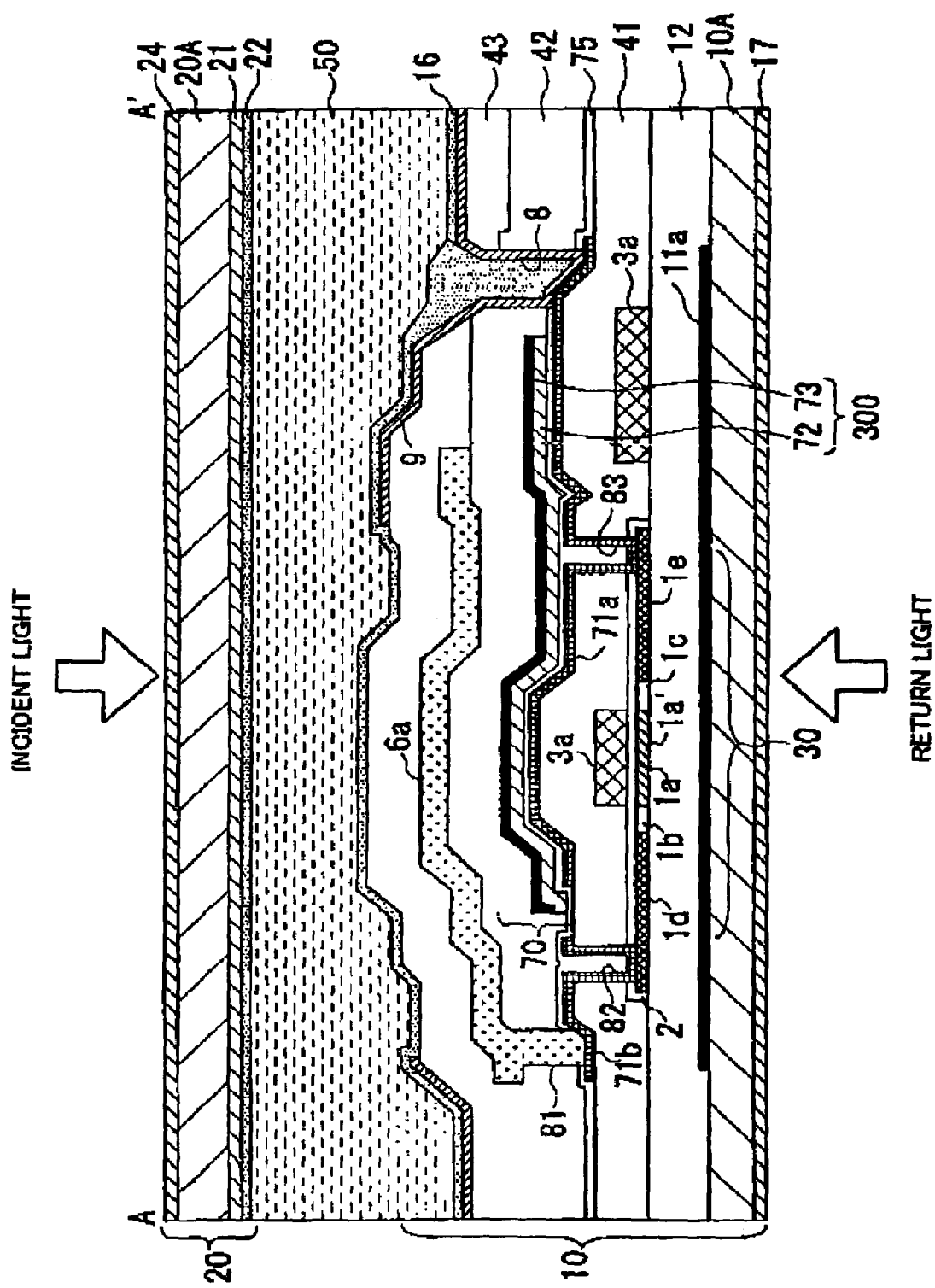
FIG. 5 is a cross-sectional view, taken along line A–A' in FIG. 4.
Figure 6:
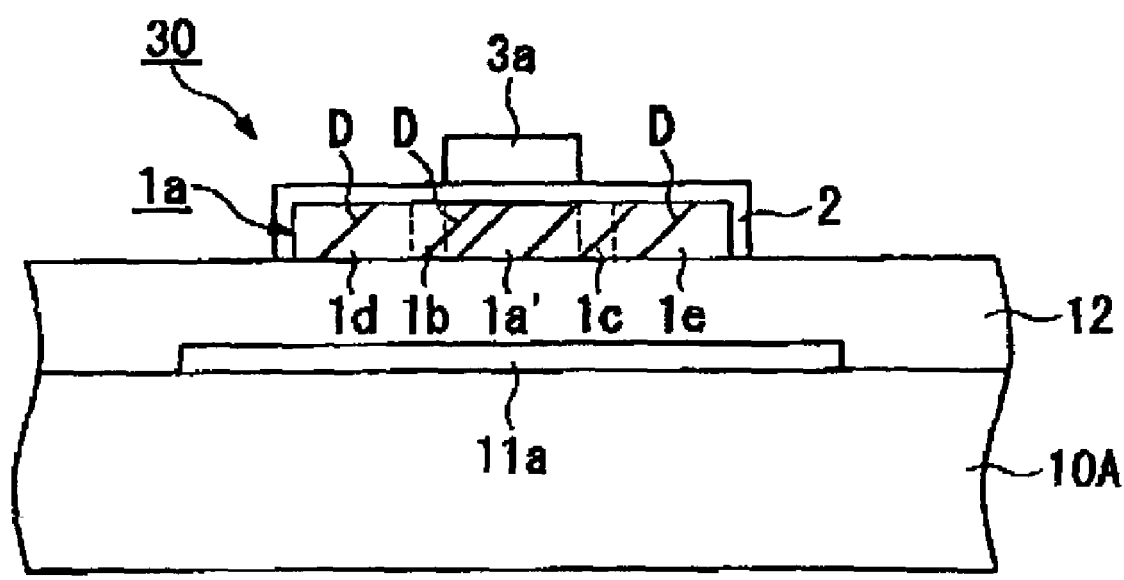
FIG. 6 is a cross-sectional view only of a TFT in FIG. 5.
Figure 7:
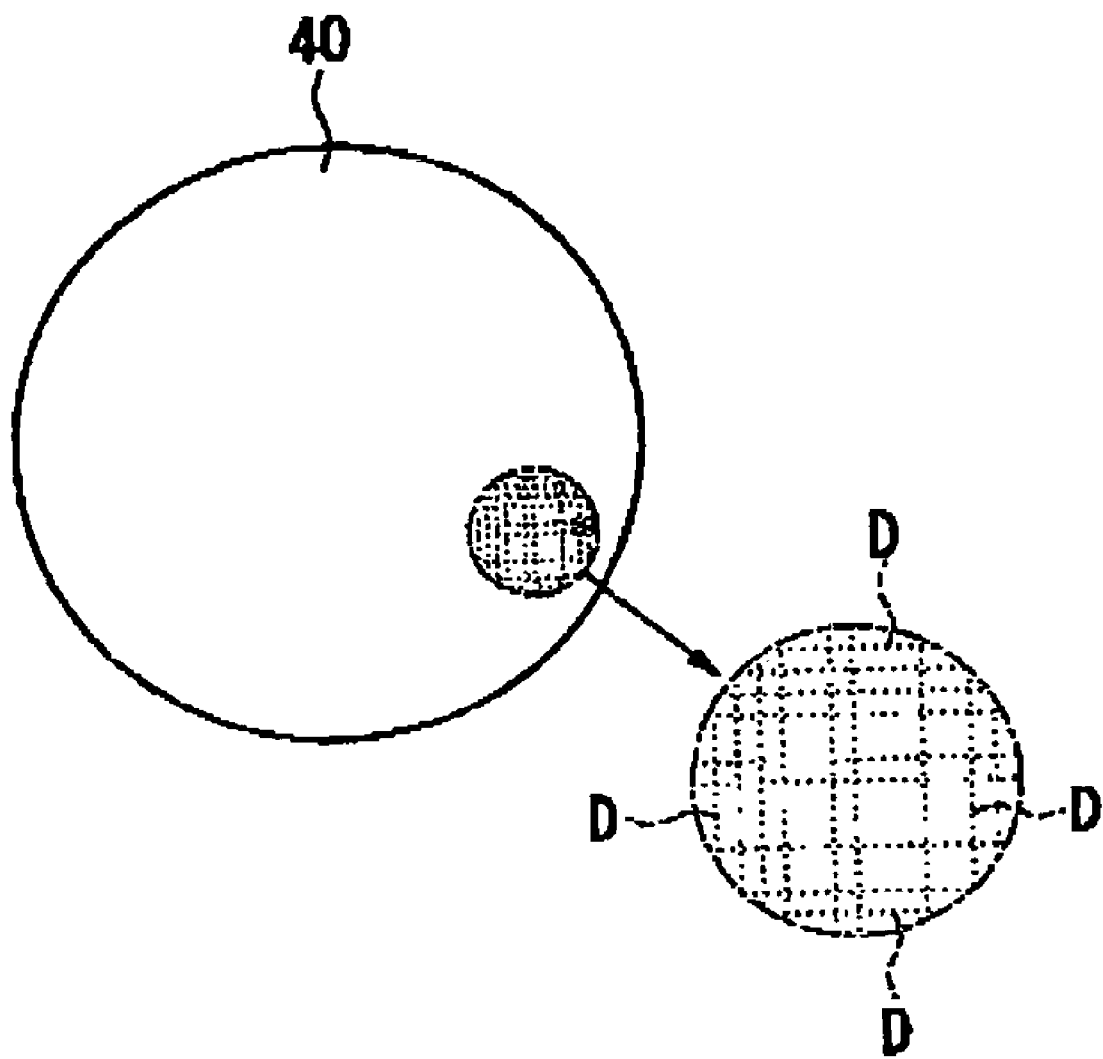
FIG. 7 is a plan view showing a bonded substrate used to produce the liquid crystal light valve.

FIG. 1 is a schematic structural view of a liquid crystal light valve as an example of an electrooptic device of the present invention, FIG. 2 is a cross-sectional view, taken along line H–H' in FIG. 1, FIG. 3 is an equivalent circuit diagram of a plurality of pixels formed in a matrix so as to constitute the liquid crystal light valve, FIG. 4 is a plan view of the plurality of pixels, FIG. 5 is a cross-sectional view, taken along line A–A' in FIG. 4, FIG. 6 is a cross-sectional view only of a TFT, and FIG. 7 is a plan view of a bonded substrate used to produce the liquid crystal light valve. In the figures, layers and members are shown on different scales in order that they have sizes such as to be viewable in the figures.

In the configuration of a liquid crystal light valve 1 of this embodiment, as shown in FIGS. 1 and 2, a sealing member 52 is formed on a TFT array substrate 10 along the edges of a counter substrate 20, and a shielding film 53 (framing member) is formed as a frame in parallel with and inside the sealing member 52. Outside the sealing member 52, a data-line driving circuit 201 and external-circuit connecting terminals 202 are provided along one edge of the TFT array substrate 10, and scanning-line driving circuits 104 are provided along two edges adjacent to the one edge.

A plurality of lines 105 for connecting the scanning-line driving circuits 104 on both sides of an image display region are provided along the remaining edge of the TFT array substrate 10. A conductive material 106 for electrical conduction between the TFT array substrate 10 and the counter substrate 20 is provided at least one of the corners of the counter substrate 20. As shown in FIG. 2, the counter substrate 20 having almost the same outline as that of the sealing member 52 shown in FIG. 2 is fixed to the TFT array substrate 10 with the sealing member 52, and TN liquid crystal 50 is sealed between the TFT array substrate 10 and the counter substrate 20. An opening formed in the sealing member 52, shown in FIG. 1, is a liquid-crystal inlet 52a, which is sealed with a sealing material 25.

Referring to FIG. 3, each of a plurality of pixels formed in a matrix, so as to constitute the image display region of the liquid crystal light valve 1 of this embodiment, can include a pixel electrode 9 and a TFT 30 for controlling the switching of the pixel electrode 9, and a data line 6a to which an image signal that is supplied is electrically connected to a source region of the TFT 30.

Image signals S1, S2, . . . , Sn to be written in data lines 6a may be line-sequentially supplied in that order, or may be supplied in groups to a plurality of adjoining data lines 6a.

Scanning lines 3a are electrically connected to the corresponding gates of the TFTs 30, and scanning signals G1, G2, . . . , and Gm are line-sequentially applied to the corresponding scanning lines 3a in that order, in a pulse form, and at a predetermined timing. The pixel electrodes 9 are electrically connected to the corresponding drains of the TFTs 30, and the image signals S1, S2, . . . , and Sn supplied from the data lines 6a are written therein at a predetermined timing by activating the TFTs 30 serving as the switching elements only for a predetermined period. The predetermined-level image signals S1, S2, . . . , and Sn written in the liquid crystal through the pixel electrodes 9 are held for a predetermined period between the pixel electrodes 9 and a common electrode (described later) formed on the counter substrate 20. In order to prevent the held image signals from leaking, storage capacitors 70 are provided in parallel with liquid crystal capacitors formed between the pixel electrodes 9 and the common electrode.

As shown in FIG. 4, a plurality of rectangular pixel electrodes 9 (their outlines are shown as dot-line portions 9A) are formed in a matrix on the TFT array substrate 10, and data lines 6a and scanning lines 3a are formed along the lengthwise and breadthwise boundaries of the pixel electrodes 9. The scanning lines 3a are placed so as to face channel regions 1a', shaded by upward-slanting lines in FIG. 4, of semiconductor layers 1a that form the TFTs 30, and the scanning lines 3a function as gate electrodes of the TFTs 30. A detailed structure of the TFTs 30 will be described later.

As shown in FIGS. 4 and 5, in this embodiment, each storage capacitor 70 is formed by placing a relay conductive film 71a serving as a pixel-potential capacitor electrode electrically connected to a heavily-doped drain region 1e of the TFT 30 and to the pixel electrode 9, and a part of a capacitor line 300 serving as a fixed-potential capacitor electrode so as to face each other with a dielectric film 75 therebetween.

The storage capacitor 70 also functions as a shielding film. The relay conductive film 71a can be made of a conductive polysilicon film or the like, has a higher optical absorbability than that of a second film 73 that forms the capacitor line 300, and functions as an optical absorption layer placed between the second film 73 and the TFT 30. The relay conductive film 71a also serves to relay the conduction between the pixel electrode 9 and the TFT 30.

The capacitor line 300 is formed of a multilayer film in which a first film 72 and a second film 73 are stacked, and the capacitor line 300 itself functions as a shielding film. The first film 72 functions as an optical absorption layer placed between the second film 73 and the TFT 30, and can be made of, for example, a conductive polysilicon, amorphous silicon, or single-crystal silicon film having a thickness of approximately 50 nm to 150 nm. The second film 73 functions as a shielding layer for shielding the TFT 30 from incident light on the upper side of the TFT 30, has a thickness of approximately 150 nm, and can be made of a single metal, an alloy, metal silicide, or polysilicide including at least one of the high-melting metals, such as Ti, Cr, W, Ta, Mo, and Pb, a laminate of them, or a metal, such as Al, that is not a high-melting metal. While the second film 73 does not need to be conductive, when it is made of a conductive material, the resistance of the capacitor line 300 can be reduced further.

As shown in FIG. 5, the dielectric film 75 is placed between the relay conductive film 71a and the capacitor line 300. The dielectric film 75 is made of, for example, a relatively thin silicon oxide film, silicon nitride film, or nitrided oxide film having a thickness of approximately 5 nm to 200 nm, or of a laminate thereof. In order to enlarge the storage capacitor 70, it is preferable that the dielectric film 75 be as thin as possible as long as the reliability of the film can be sufficiently achieved.

Each capacitor line 300 includes a main line portion that extends like a stripe along the scanning line 3a, in plan view, and a portion extending from the main line portion and overlapping with the TFT 30 protrudes upward and downward in FIG. 4. In FIG. 4, the TFTs 30 are placed on the TFT array substrate 10 at the intersections of the data lines 6a extending in the upward/downward direction in FIG. 4 and the capacitor lines 300 extending in the rightward/leftward direction. That is, the TFTs 30 are doubly covered with the data lines 6a and the capacitor lines 300, as viewed from the side of the counter substrate 20. The data lines 6a and the capacitor lines 300 intersecting each other form a shielding layer shaped like a lattice in plan view, and define aperture regions of the pixels.

A lattice-shaped lower shielding film 11a made of for example, a material similar to that of the above-described second film 73 is provided on the TFT array substrate 10 below the TFT 30.

The lower shielding film 11a is narrower than the capacitor lines 300 and the data lines 6a, and is a size smaller than the capacitor lines 300 and the data lines 6a. The channel region 1a of each TFT 30, including junctions to a lightly-doped source region 1b and a lightly-doped drain region 1c, is placed inside the intersecting portions of the lower shielding film 11a. An optical absorption layer may be formed on the inner surface of the lower shielding film 11a.

The capacitor lines 300 extend from the image display region, in which the pixel electrodes 9 are arranged, to the periphery thereof, and are electrically connected to a potentiostatic source so as to have a fixed potential. Preferably, the lower shielding film 11a also extends from the image display region to the periphery thereof and is connected to the potentiostatic source, in a manner similar to that in the capacitor line 300, in order to prevent potential changes thereof from affecting the TFTs 30.

As shown in FIGS. 4 and 5, the data line 6a is connected to a relay conductive film 71b for relay connection through a contact hole 81, and the relay conductive film 71b is electrically connected to a heavily-doped source region 1d of the semiconductor layer 1a made of, for example, a polysilicon film through a contact hole 82. The pixel electrode 9 is electrically connected to a heavily-doped drain region 1e of the semiconductor layer 1a through a contact hole 83 and a contact hole 8. The relay conductive film 71b is made of the same film as that of the relay conductive film 71a, and is formed simultaneously with the relay conductive film 71a.

A first interlayer insulating film 41, through which the contact hole 82 communicating with the heavily-doped source region 1d and the contact hole 83 communicating with the heavily-doped drain region 1e are formed, is formed on the scanning line 3a. The relay conductive films 71a and 71b and the capacitor line 300 are formed on the first interlayer insulating film 41, and a second interlayer insulting film 42, through which the contact hole 81 and the contact hole 8 respectively communicating with the relay conductive films 71a and 71b, is formed thereon. The data line 6a is formed on the second interlayer insulating film 42, and a third interlayer insulating film 43 having the contact hole 8 communicating with the relay conductive film 71a is formed thereon. The pixel electrode 9 is provided on the upper surface of the third interlayer insulating film 43 having a such structure.

As shown in FIGS. 4 and 5, the liquid crystal light valve 1 of this embodiment includes the TFT array substrate 10 having a main substrate 10A made of a transparent quartz substrate, and the transparent counter substrate 20 opposing the TFT array substrate 10. Pixel electrodes 9 made of a transparent conductive film of, for example, indium tin oxide (hereinafter abbreviated as "ITO") are formed on the TFT array substrate 10, and an alignment film 16 subjected to a predetermined alignment treatment, such as rubbing, is formed thereon. The alignment film 16 is made of an organic film, such as a polyimide film. A polarizer 17 is provided on the main substrate 10A of the TFT array substrate 10 on the opposite side of a liquid crystal layer 50.

A common electrode 21 is formed over the entire main substrate 20A of the counter substrate 20, and an alignment film 22 subjected to a predetermined alignment treatment, such as rubbing, is provided under the common electrode 21. The common electrode 21 is made of a transparent conductive film, such as an ITO film, in a manner similar to that in the pixel electrodes 9. The alignment film 22 is made of an organic film, such as a polyimide film. A polarizer 24 is formed on the main substrate 20A of the counter substrate 20 on the opposite side of the liquid crystal layer 50.

Liquid crystal is sealed in a space enclosed by the sealing member 52 between the TFT array substrate 10 and the counter substrate 20 having such configurations and placed so that the pixel electrodes 9 and the common electrode 21 face each other, thereby forming the liquid crystal layer 50. The liquid crystal layer 50 is placed in a predetermined aligned state by the alignment films 16 and 22 in a state in which electric fields are not applied from the pixel electrodes 9. The liquid crystal layer 50 is made of one kind of nematic liquid crystal or a mixture of several kinds of nematic liquid crystals. An insulating underlayer 12 is provided under the TFT 30. The insulating underlayer 12 serves to insulate the TFT 30 from the lower shielding film 11a, and is formed over the entire surface of the TFT array substrate 10 in order to prevent the characteristics of the TFT 30 from being changed, for example, by the surface roughness of the TFT array substrate 10 due to polishing and by stains remaining after cleaning.

As shown in FIG. 5, the TFT 30 has an LDD structure, and includes a scanning line 3a, a channel region 1a' of a semiconductor layer 1a in which a channel is formed by the electric field from the scanning line 3a, a thin insulating film 2 including a gate insulating film for insulating the scanning line 3a and the semiconductor layer 1a, a lightly-doped source region 1b and a lightly-doped drain region 1c of the semiconductor layer 1a, and a heavily-doped source region 1d and a heavily-doped drain region 1e of the semiconductor layer 1a.

In this embodiment, the semiconductor layer 1a is made of a single-crystal silicon layer having a (100) plane in contact with the insulating underlayer 12. As shown in FIG. 6, a plurality of line defects D extending along a (111) crystal plane of the single-crystal silicon are produced over the channel region 1a', the lightly-doped source region 1b, the lightly-doped drain region 1c, the heavily-doped source region 1d, and the heavily-doped drain region 1e in the semiconductor layer 1a. The pitch between the adjoining line defects D is random. While multiple line defects D are produced in FIG. 6, it is satisfactory that at least one line defect is formed at a random pitch in the channel region 1a'.

An SOQ substrate (composite substrate) formed by bonding a quartz substrate and a single-crystal silicon substrate with an insulating layer therebetween is used as the TFT array substrate 10 in this embodiment. For example, a single-crystal silicon may be bonded to a quartz substrate after a silicon oxide film is formed thereon, or silicon oxide films may be formed on a quartz substrate and a single-crystal silicon substrate, respectively, and the quartz substrate and the single-crystal silicon substrate may be then bonded together so that the silicon oxide films are in contact with each other. In any case, since the quartz's coefficient of linear expansion of approximately $5.5 \times 10^{-7}$/K and the silicon's coefficient of linear expansion of approximately $2.6 \times 10^{-6}$/K are substantially different, line defects D can be produced in a lattice form at a random pitch on a single-crystal silicon layer in an SOQ substrate 40 before treatment (before the single-crystal silicon layer is patterned), as shown in FIG. 7.

For example, when it is assumed that the gate length and gate width of the minimum P-channel transistor in the TFT array substrate 10 are 2 µm and 5 µm and the gate length and gate width of the minimum N-channel transistor are 4 µm and 5 µm, the gate length and gate width of the minimum transistor on the TFT array substrate 10 are 2 µm and 5 µm. In this case, by producing line defects D so that the pitch thereof is less than the larger one of these channel width and channel length, that is, less than 5 µm, there is a probability that at least one line defect will be produced in the channel region of every TFT on the TFT array substrate 10.

Three specific examples of SOQ substrates having a shielding layer that can be used in this embodiment will now be described.

Figure 9:
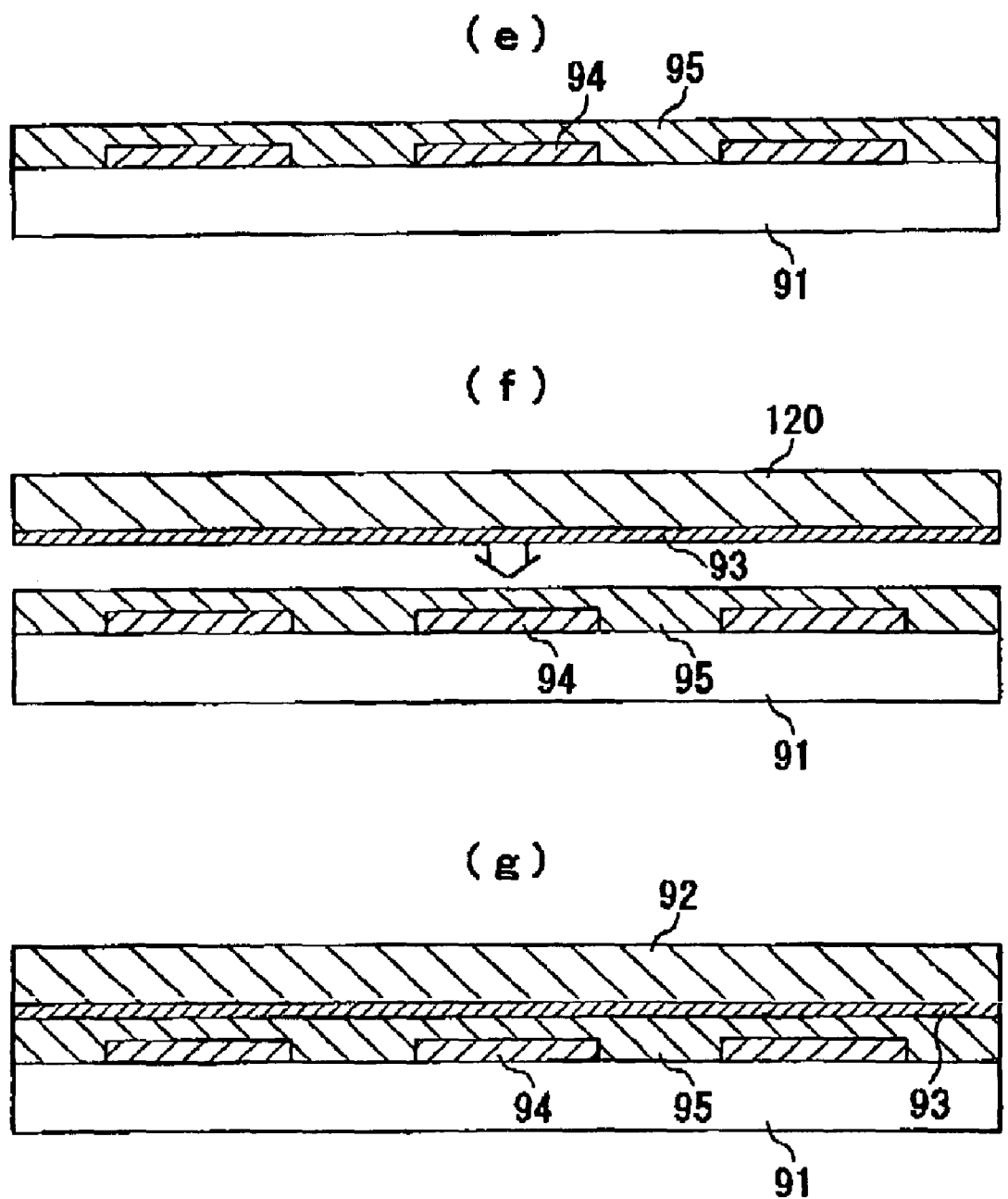
FIGS. 9(*e*) to 9(*g*) are views showing subsequent production processes.

FIGS. 8 and 9 are views showing a production method for an SOQ substrate of the first example. The production process for the SOQ substrate will be described in detail. First, as shown in FIG. 8(a), a shielding layer 94 is formed on a support substrate 91 made of a transparent quartz substrate. Next, as shown in FIG. 8(b), a photoresist pattern 113 is formed on the shielding layer 94. Subsequently, as shown in FIG. 8(c), the shielding layer 94 is etched with the photoresist pattern 113 as a mask so as to remove a portion of the shielding layer 94 other than transistor forming regions by dry etching, and the photoresist pattern 113 is peeled off after etching. Next, as shown in FIG. 8(d), an insulating layer 95 is deposited in order to ensure insulation between the shielding layer 94 and a single-crystal silicon layer formed thereon. A silicon oxide film was used as the insulating layer 95. The silicon oxide film can be formed by, for example, sputtering or plasma CVD using TEOS (tetraethyl orthosilicate).

The thickness of the insulating layer 95 is determined so that a sufficient insulation from the single-crystal silicon layer 92 can be ensured on the shielding layer 94 even when the uneven surface of the shielding layer 94 are flattened by polishing. More specifically, it is preferable that the thickness of the deposited insulating layer 95 be approximately 500 nm to 1000 nm larger then the thickness of the shielding layer 94. In this example, a silicon oxide film of 1000 nm was deposited by plasma CVD using TEOS in contrast to a shielding layer of 400 nm. Since the surface of the support substrate 91 with the shielding layer 94 thus obtained has irregularities corresponding to the presence or absence of the shielding layer 94, when it is simply bonded to the single-crystal silicon substrate, voids are formed in stepped portions of the irregularities, and this results in nonuniform bonding strength.

For this reason, as shown in FIG. 9(e), the surface of the support substrate 91 having the shielding layer 94 is globally flattened by polishing. CMP (chemical mechanical polishing) was used as a flattening method using polishing. In CMP, it is preferable that the amount of polishing of the insulating layer 95 on the shielding layer 94 be set to be approximately 200 nm to 700 nm larger than the thickness of the shielding layer 94. By performing CMP on this condition, the height differences at the ends of the shielding layer pattern can be reduced to 3 nm or less, and therefore, a uniform bonding strength can be ensured over the entire substrate when bonded to the single-crystal silicon substrate. Next, as shown in FIG. 9(f), the support substrate 91 having the shielding layer 94 and a single-crystal silicon substrate 120 are bonded together.

The single-crystal silicon substrate 120 to be used for bonding has a thickness of 300 μm, and the surface thereof is oxidized by approximately 0.05 μm to 0.8 μm beforehand to form an oxide layer 93. This is done to form an interface between a single-crystal silicon layer 92, which will be formed after bonding, and the oxide layer 93 by thermal oxidation and to ensure good electrical characteristics of the interface. For example, a bonding method may be adopted in which two substrates are directly bonded by performing heat treatment for two hours at 300°. Although the heat treatment temperature needs to be further increased to approximately 450° C. in order to further increase the bonding strength, since the quartz substrate and the single-crystal silicon substrate are substantially different in coefficient of thermal expansion, when they are further simply heated, a defect, such as a crack, occurs in the single-crystal silicon layer, and the substrate quality deteriorates.

In order to suppress a defect, such as a crack, it is preferable to reduce the thickness of the single-crystal silicon substrate, which has been subjected to heat treatment for bonding at 300° C., to approximately 100 μm to 150 μm by wet etching or CMP and to then subject the single-crystal silicon substrate to a higher-temperature heat treatment. In this example, etching was performed using a KOH solution of 80° C. so as to reduce the thickness of the single-crystal silicon substrate to 150 μm. Subsequently, the bonding strength was increased by subjecting the bonded substrate again to heat treatment at 450° C. Furthermore, as shown in FIG. 9(g), the thickness of the single-crystal silicon layer 92 was reduced to 3 μm to 5 μm by polishing the bonded substrate.

The bonded substrate thinned in this way is finally etched and finished by PACE (Plasma Assisted Chemical Etching) so that the thickness of the single-crystal silicon layer 92 is approximately 0.05 μm to 0.8 μm. By this PACE, for example, the single-crystal silicon layer 92 having a thickness of 100 nm was obtained which had a uniformity of 10% or less. Through the above processes, an SOQ substrate having a shielding layer can be produced.

FIGS. 10 and 11 are views showing a second example of an SOQ substrate. The same reference numerals as those in FIGS. 8 and 9 denote layers or members formed by the same processes. In this example, processes to the process shown in FIG. 9(e) for flattening the surface of a support substrate having a patterned shielding layer are just the same as those in the above-described first example. FIG. 10(a) shows a single-crystal silicon substrate used for bonding. This single-crystal silicon substrate 120 has a thickness of 600 μm, and the surface thereof was oxidized by approximately 0.05 μm to 0.8 μm beforehand to form an oxide layer 93. Subsequently, as shown in FIG. 10(b), hydrogen ions 114 are implanted into the single-crystal silicon substrate 120. For example, in this example, a dose of $10 \times 10^{16}$ cm$^{-2}$ of hydrogen ions (H$^+$) were implanted at an acceleration voltage of 100 keV. By this operation, a high-concentration hydrogen-ion layer 115 is formed in the single-crystal silicon substrate 120. Next, as shown in FIG. 10(c), the single-crystal silicon substrate 120 implanted with the ions is bonded to a support substrate 91 having a shielding layer 94 and an insulating layer 95. For example, a bonding method may be adopted in which two substrates are directly bonded by conducting heat treatment for two hours at 300° C.

In FIG. 11(d), heat treatment is conducted to peel the single-crystal silicon substrate 120 off the support substrate 91 in a state in which the oxide film 93 on the bonding side of the bonded single-crystal silicon substrate 120 (this serves as a buried oxide film when the SOQ substrate is completed) and a single-crystal silicon layer 92 remain on the support substrate 91. The substrate is peeled off because silicon bonding is broken in a layer adjacent to the surface of the single-crystal silicon substrate 120 by the hydrogen ions implanted into the single-crystal silicon substrate 120. In this example, the two bonded substrates were heated to 600° C. at a programming rate of 20° C./h. By the heat treatment, the bonded single-crystal silicon substrate 120 is separated from the support substrate 91, a silicon oxide film 93 of approximately 400 nm is formed on the surface of the support substrate 91, and a single-crystal silicon layer 92 of approximately 200 nm is formed thereon.

FIG. 11(e) is a cross-sectional view of the SOQ substrate after separation. Since irregularities of approximately several nanometers remain on the surface of the single-crystal silicon layer 92 in the SOQ substrate, the surface needs to be flattened. For that purpose, in this example, touch polishing was performed in which the substrate surface was polished by a small amount (polished by less than 10 nm) by CMP. As the flattening method, hydrogen annealing in which heat treatment is performed in a hydrogen atmosphere may be used. In the SOQ substrate produced as described, the thickness of the single-crystal silicon layer is highly uniform, and a light shielding layer for suppressing light leakage from a device to be produced is provided.

FIGS. 12 and 13 show a third example of an SOQ substrate. The same reference numerals as those in FIGS. 8 to 11 denote layers or members formed by the same processes. In this example, processes to the process shown in FIG. 9(e) for flattening the surface of a support substrate having a patterned shielding layer are just the same as those in the above-described first example.

FIG. 12(a) shows a silicon substrate used to form a single-crystal silicon layer for bonding. A silicon substrate 116 has a thickness of 600 μm, and the surface thereof can be made into a porous layer 117 by being subjected to anodization in an HF/ethanol solution. The single-crystal silicon substrate 116 whose surface has been made porous by approximately 12 μm by this treatment is subjected to heat treatment at 1050° C. in a hydrogen atmosphere, thereby smoothening the surface of the porous layer 117. This is to reduce the defect density of a single-crystal silicon layer, which will be formed on the silicon substrate 116 later, and to improve the quality thereof.

Next, as shown in FIG. 12(b), a single-crystal silicon layer 92 is formed by epitaxial growth on the silicon substrate 116 in which the surface of the porous silicon layer 117 has been smoothened. While the thickness of the single-crystal silicon layer 92 deposited by epitaxial growth is 500 nm in this example, it should be understood that it may be arbitrarily determined depending on a device to be produced. Furthermore, as shown in FIG. 12(c), an oxide layer 93 is formed by oxidizing the surface of the single-crystal silicon layer 92 by approximately 50 nm to 400 nm so that it serves as a buried oxide film of the SOQ substrate after bonding.

As shown in FIG. 13(d), the substrate having the single-crystal silicon layer 92 and the oxide layer 93 is bonded to a support substrate 91 having a shielding layer 94 and an insulating layer 95. For example, a bonding method may be adopted in which two substrates are directly bonded by heat treatment for two hours at 300° C. Next, as shown in FIG. 13(e), the silicon substrate is ground while the surface oxide film 93, the single-crystal silicon layer 92, and the porous silicon layer 117 on the bonding side are left. Next, as shown in FIG. 13(f), the porous silicon layer 117 is removed by etching, so that the single-crystal silicon layer 92 is obtained on the support substrate 91. When the porous silicon layer 117 is etched with an etchant having a composition of $HF/H_2O_2$, it has an etching selectivity higher than that of the single-crystal silicon layer 92, and therefore, it is possible to completely remove only porous silicon while maintaining a highly uniform thickness of the single-crystal silicon.

In the SOQ substrate from which the porous silicon layer 117 is removed in this way, since irregularities of approximately several nanometers remain on the surface of the single-crystal silicon layer 92, they need to be flattened. For that purpose, in this example, hydrogen annealing was used in which heat treatment was treated in a hydrogen atmosphere. As the flattening method, touch polishing may be used in which the surface of the single-crystal silicon layer 92 of the SOQ substrate is polished by a small amount (polished by less than 10 nm) by CMP. In the SOQ substrate produced as described, the thickness of the single-crystal silicon film is highly uniform, and a light shielding layer for suppressing light leakage from the device to be produced is provided.

In this embodiment, since the TFT 30 having the single-crystal silicon layer as the semiconductor layer 1a is provided on the TFT array substrate 10, it is possible to provide a TFT array substrate that achieves a high mobility and a high current driving ability. In general, when a single-crystal silicon layer is used, excess carriers are produced by impact ionization and the electrical characteristics are deteriorated by a substrate floating effect. In this embodiment, however, since at least one line defect D exists in the channel region 1a' of the TFT 30, it functions as a recombination center of the excess carriers. Consequently, the excess carriers are prevented from being accumulated, and the substrate floating effect can be suppressed without forming a body contact region, unlike in the conventional structure. As a result, it is possible to achieve a liquid crystal light valve that has superior electrical characteristics while maintaining a high aperture ratio.

While the TFT 30 adopts an LDD structure, even when light enters the LDD region and carriers are produced by optical excitation, the passage of a leak current can be prevented by the recombination center formed of the line defect D. Furthermore, since a body contact region is unnecessary in the TFT 30 of this embodiment, an image display region having a high aperture ratio can be obtained, and the area occupied by the peripheral driving circuit section can be reduced. This can reduce the width of the frame and the size of the device.

Since the data line 6a has a light shielding ability and the data line 6a and the capacitor line 300 that forms a shielding film intersect on the side offset from the TFT 30 toward the liquid crystal layer, the channel region 1a' that constitutes the TFT 30 is doubly shielded by the data line 6a and the capacitor line 300, and this achieves a highly shielding ability. In particular, since the aperture region of each pixel is defined by the data line 6a and the capacitor line 300, a general shielding film provided in the counter substrate 20 may be omitted. Therefore, the liquid crystal light valve 1 of this embodiment makes it possible to display a high-contrast and high-quality image, and to achieve high endurance while limiting the reduction of the aperture ratio.

Figure 14:
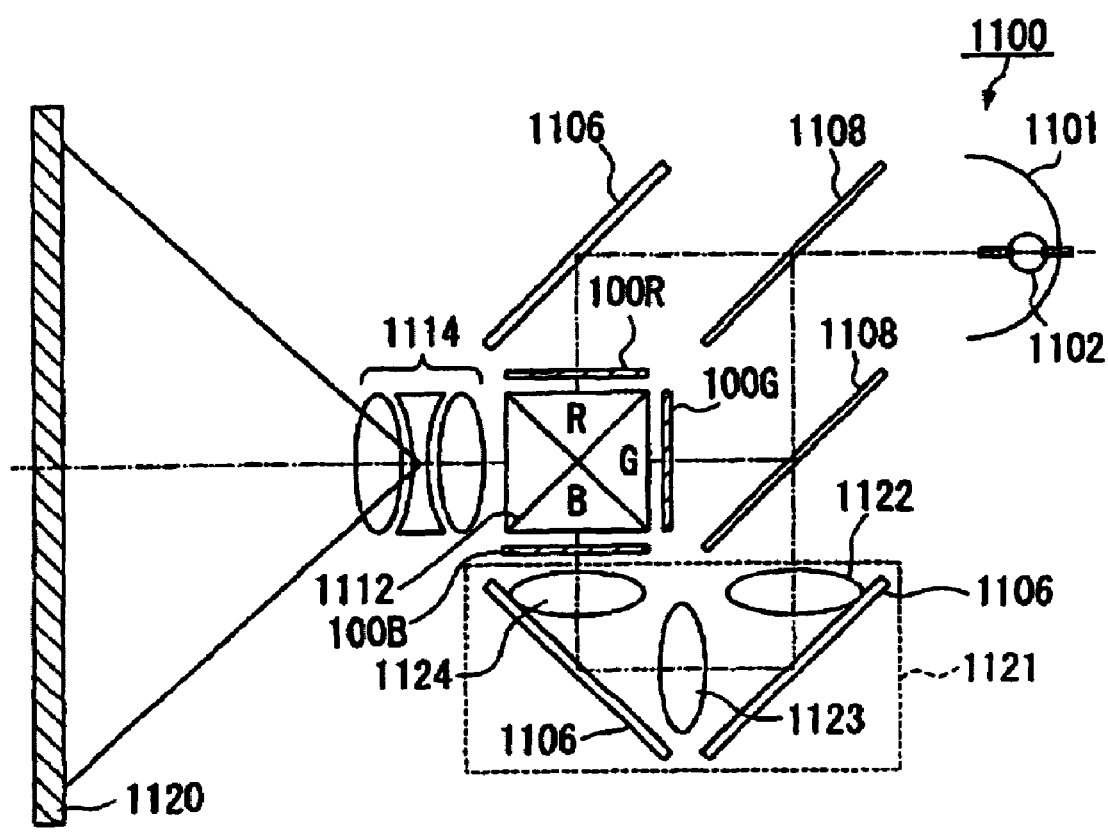
FIG. 14 is a schematic structural view of a projection display device according to an embodiment of the present invention.

FIG. 14 is a schematic structural view showing an example of a so-called three-panel projection liquid crystal display device (liquid crystal projector) using three liquid crystal light valves according to the above-described embodiment. In the figure, reference numeral 1100 denotes a light source, 1108 denotes dichroic mirrors, 1106 denotes a reflecting mirror, 1122, 1123, and 1124 denote relay lenses, 100R, 100G, and 100B denote liquid crystal light valves, 1112 denotes a crossed dichroic prism, and 1114 denotes a projection lens system.

The light source 1100 includes a lamp 1102, such as a metal halide lamp, and a reflector 1101 for reflecting light from the lamp 1102. The dichroic mirror 1108 for reflecting blue light and green light transmits red light of white light from the light source 1100, and reflects blue light and green light. The transmitted red light is reflected by the reflecting mirror 1006 and enters the red-light liquid crystal light valve 100R.

Green light of the color light reflected by the dichroic mirror 1108 is reflected by the dichroic mirror 1108 for reflecting green light and enters the green liquid crystal light valve 100G. Blue light passes through the second dichroic mirror 1108. In order to compensate for the difference of the blue light in optical path length from the green light and red light, a light guide 1121, formed of a relay lens system including an incident lens 1122, a relay lens 1123, and an emergent lens 1124 can be provided, and the blue light enters the blue-light liquid crystal light valve 100B therethrough.

The three light components modulated by the light valves 100R, 100G, and 100B enter the crossed dichroic prism 1112. In the prism 1112, four rectangular prisms are bonded together, a dielectric multilayer film for reflecting red light and a dielectric multilayer film for reflecting blue light are arranged in the shape of a cross on the inner surfaces thereof. These dielectric multilayer films combine the three light components, thereby forming light representing a color image. The combined light is projected onto a screen 1120 by the projection lens system 1114 serving as a projection optical system, so that an image is enlarged and displayed thereon.

Since the projection liquid crystal display device having the above configuration adopts the liquid crystal light valves according to the above embodiment, when a high-intensity light source is used, it is possible to limit the deterioration of electrical characteristics due to, for example, an optical leak current, and to achieve a projection liquid crystal display device that provides high image quality.

It should be understood that the technical field of the present invention is not limited to the above embodiment, and various changes may be possible without departing from the spirit and scope of the present invention. For example, the configurations of the TFT array substrate and the TFT itself that constitute the liquid crystal light valve of the above embodiment are specifically described as examples, and they may be changed appropriately. Further, the electrooptic device is a liquid crystal light valve in the above description, the present invention is not limited thereto, and of course, is also applicable to electrooptic devices using various electronic elements adopting an electrophoretic device, an electroluminescence (EL) device, a digital micromirror device (DMD), and a plasma light emission and electron emission fluorescent light, and to electronic devices having the electrooptic devices.

While the line defect has been described as an example in the above embodiment, similar advantages can be expected when crystal defects other than the line defect are produced.

As described in detail above, according to the present invention, since at least one line defect or crystal defect of another type exists in the channel region of the TFT, and it acts as a recombination center of excess carriers, the accumulation of the excess carriers is prevented, and a substrate floating effect can be suppressed without forming a body contact region unlike in the conventional structure. As a result, the frame width and device size can be reduced while maintaining a high aperture ratio, and an electrooptic device, such as a liquid crystal device, having superior electrical characteristics can be achieved.

What is claimed is:

1. An electrooptic device having a composite substrate, comprising:
    a support substrate having a first coefficient of thermal expansion;
    an insulating layer formed on said support substrate;
    a single-crystal semiconductor layer formed on said insulating layer and having a second coefficient of thermal expansion that is different from the first coefficient of thermal expansion, the single-crystal semiconductor layer including a channel region, heavily-doped regions on either side of the channel region, and a lightly-doped region between each of the heavily-doped regions and the channel region; and
    a thin-film transistor using said single-crystal semiconductor layer as a channel region that is formed on said insulating layer, and said single-crystal semiconductor layer that forms said channel region including at least one line defect caused by warping when the two different thermal expansion coefficient layers are attached together, the line defect extending across the channel region, the lightly-doped regions, and the heavily-doped regions, the line defect forming a recombination center of excess carriers produced by optical excitation when light enters the lightly-doped regions.

2. An electrooptic device according to claim 1, said support substrate being a glass substrate.

3. An electrooptic device according to claim 1, said support substrate being a quartz substrate.

4. An electrooptic device according to claim 1, said single-crystal semiconductor layer being a single-crystal silicon layer.

5. An electrooptic device according to claim 1, further comprising:
    a display section formed by a plurality of pixels; and
    a peripheral driving-circuit section that drives said display section,
    said thin-film transistor being used both in said display section and said peripheral driving-circuit section.

6. An electrooptic device having a composite substrate, comprising:
    a support substrate having a first coefficient of thermal expansion;
    an insulating layer formed on said support substrate; and
    a single-crystal semiconductor layer formed on said insulating layer and having a second coefficient of thermal expansion that is different from the first coefficient of thermal expansion, the single-crystal semiconductor layer including a channel region, heavily-doped regions on either side of the channel region, and a lightly-doped region between each of the heavily-doped regions and the channel region; and
    a thin-film transistor using said single-crystal semiconductor layer as a channel region that is formed on said insulating layer, and said single-crystal semiconductor layer that forms said channel region including at least one crystal defect caused by warping when the two different thermal expansion coefficient layers are attached together, the crystal defect extending across the channel region, the lightly-doped regions, and the heavily-doped regions, the crystal defect forming a recombination center of excess carriers produced by optical excitation when light enters the lightly-doped regions.

7. A liquid crystal device wherein said composite substrate in said electrooptic device according to claim 1 serves as a first substrate, and a liquid crystal layer is sandwiched between said first substrate and a second substrate, and said first substrate comprising:
    a plurality of pixel electrodes arranged in a matrix so as to apply a voltage to said liquid crystal layer;
    a plurality of thin-film transistors electrically connected to said pixel electrodes and each having a channel region formed of said single-crystal semiconductor layer;
    shielding films disposed offset from said thin-film transistors toward said liquid crystal layer; and
    data lines that are disposed offset from said thin-film transistors toward said liquid crystal layer so as to intersect said shielding films, the data lines being electrically connected to said thin-film transistors, and having a light shielding ability.

8. A liquid crystal device according to claim 7, said shielding films including a light absorbing layer and a shielding layer, and said light absorbing layer being formed to face said thin-film transistors.

9. A liquid crystal device according to claim 7, relay conductive films that electrically connect said pixel electrodes and said thin-film transistors being formed on the sides of said shielding films facing said thin-film transistors with a dielectric layer therebetween, and said shielding films and said relay conductive films functioning as capacitor electrodes so as to constitute storage capacitors.

10. A projection display device, comprising:
    a light source;
    an optical modulation device, formed of said liquid crystal device according to claim 7, that modulates light from said light source; and
    a projection device that projects the light modulated by said optical modulation device.

11. An electrooptic device, comprising:

a support substrate having a first coefficient of thermal expansion;

an insulating layer formed on the support substrate;

a thin-film transistor including a channel region having a channel width and a channel length, the channel region being formed from a single-crystal semiconductor layer formed on the insulating layer, the single-crystal semiconductor layer having a second coefficient of thermal expansion different from the first coefficient of thermal expansion and including line defects with a pitch less than the larger of the channel width and the channel length.

* * * * *